United States Patent [19]
Yoshioka et al.

[11] Patent Number: 6,089,680
[45] Date of Patent: Jul. 18, 2000

[54] STABILITY CONTROL SYSTEM FOR VEHICLE

[75] Inventors: Tohru Yoshioka; Tomohiko Adachi, both of Hiroshima, Japan

[73] Assignee: Mazda Motor Corporation, Hiroshima, Japan

[21] Appl. No.: 09/049,127

[22] Filed: Mar. 27, 1998

[30] Foreign Application Priority Data

Mar. 27, 1997 [JP] Japan ..................................... 9-075296

[51] Int. Cl.[7] .................................. B60T 8/60; B60T 8/24
[52] U.S. Cl. ........................................ 303/146; 303/140
[58] Field of Search .......................... 180/197; 303/146, 303/147, 140, 189, 148

[56] References Cited

U.S. PATENT DOCUMENTS

| 5,560,690 | 10/1996 | Hattori et al. | 303/146 |
|---|---|---|---|
| 5,627,756 | 5/1997 | Fukada et al. | 180/197 |
| 5,645,326 | 7/1997 | Sano | 303/146 |
| 5,711,585 | 1/1998 | Tozu et al. | 303/146 |
| 5,863,105 | 1/1999 | Sano | 303/146 |

FOREIGN PATENT DOCUMENTS 7-232629  9/1995  Japan .

*Primary Examiner*—Robert J. Oberleitner
*Assistant Examiner*—Robert A. Siconolfi
*Attorney, Agent, or Firm*—Nixon Peabody LLP; Donald R. Studebaker

[57] ABSTRACT

A stability control system for controlling an running attitude of a vehicle by applying braking force selectively and independently to the wheels so as to direct the vehicle toward a target direction applies braking force independently to a front wheel at the inner side of the cornering path to impart a yaw moment to the vehicle so that the inner front wheel yields a wheel slip ratio less than an upper limit of understeer wheel slip ratio which is set to be smaller than a wheel slip ratio at which each wheel provides the maximum force in the running direction.

8 Claims, 12 Drawing Sheets

STABILITY CONTROL SYSTEM FOR VEHICLE

BACKGROUND OF THE INVENTION

1. Field of the Invention

The invention relates to a control system for controlling a running direction of an automotive vehicle, and, in particular, to a vehicle stability control system for controlling a braking system to apply braking force independently to wheels of the vehicle so as to direct the vehicle toward a target direction.

2. Description of the Related Art

There have been known various vehicle attitude control systems which are typically comprised of a braking system capable of applying braking force to each of four wheels and a control unit to control the braking system to apply braking force to the wheels independently so as to rectify a running attitude of the vehicle. Such an vehicle stability control system which is known from, for instance, Japanese Unexamined Patent Publication No. 7-232629, monitors variables representing a running attitude of a vehicle with respect to a running direction and controls the braking system according to the running attitude determined on the basis of the variables and causes the braking system to apply braking force to the wheels selectively and independently so as to impart an appropriate yaw moment to the vehicle. The vehicle stability control system relieves the tendency toward understeering or oversteering by means of applying a yaw moment to the vehicle and, as a result of which, prevents the vehicle from drifting out and/or spinning. The prior art vehicle stability control system adapted to change braking force applied to each wheel on the basis of an attitude has to apply strong braking force to each wheel in the event where the vehicle turns a corner with a significant deviation in attitude with respect to a target running direction. If the braking force is too strong for the wheels to provide their greatest tire gripping force, some of the wheels will be locked up. The tire gripping force is the resultant force of a longitudinal force acting in the running direction and a lateral force produced due to inertia in a direction perpendicular to the running direction. If the braking force becomes as large as the maximum longitudinal gripping force, the wheel tires can not produce sufficient lateral gripping force, making the vehicle impossible to turn sharply on a corner. In particular, if the vehicle suffers a strong tendency toward understeering, the front wheels are apt to be locked up, which leads to an unstable running attitude of the vehicle and forces, in certain cases, the vehicle to drift out of the cornering path.

SUMMARY OF THE INVENTION

It is an objective of the invention to provide a stability control system for an automotive vehicle which controls a cornering attitude of a vehicle without loosing running stability.

The foregoing object of the present invention is achieved by providing a control system for a vehicle equipped with a braking system which is capable of applying braking force to wheels of the vehicle independently so as to rectify a running attitude of the vehicle toward a target running direction. The control system judges whether the vehicle understeers when a variable representing a running attitude of the vehicle differs from a target variable by a specified deviation toward a side of understeering, establishes an upper limit of understeer wheel slip ratio smaller by a specified ratio than a wheel slip ratio at which each wheel tire provides the largest force in the running direction and causes the braking system to apply braking force independently to a front wheel at an inner side of a cornering path to impart a yaw moment to the vehicle so that the inner side front wheel yields a wheel slip ratio less than the upper limit of understeer wheel slip ratio. The upper limit of understeer wheel slip ratio is changed smaller when the vehicle is judged to understeer as compared with when the vehicle is judged not to understeer.

While the vehicle understeers, the inner front wheel is braked to impart a yaw moment to the vehicle with an effect of relieving the tendency toward understeering. Since the upper limit of the wheel is greater by a specified extent than a wheel slip ratio at which the inner front wheel provides its maximum force in the running direction and the braking force applied to the inner front wheel is consequently restricted lower by a certain extent of force than the maximum force, the inner front wheel can afford to produce lateral force with a margin of tire gripping force. Accordingly, even while the respective wheels give full play to their ability during cornering, the inner front wheel is restrained from locking up due to application of braking force, which leads to attitudinal stability of the vehicle. In particular, it is realized to let the inner front have a sufficient margin of gripping force by virtue of the upper limit of wheel slip ratio while the vehicle understeers set smaller than while the vehicle does not understeer. As a result, the vehicle is prevented from drifting out due to lockup of the inner front wheel.

The control system may change the upper limit of wheel slip ratio while the vehicle understeers smaller as the steering angle and/or the steering angle changing rate increase. This is because, in a range of larger wheel slip ratios, the longitudinal and lateral force that a wheel can provide decrease as an increase in wheel slip ratio and, the more the steering angle increase, the more the upper limit of braking force to be applied to right and left front wheels decrease and further because, when a wheel is steered quickly, the wheel loses gripping force due to twisting deformation of tire tread. The upper limit of braking force applied to either one of the steering front wheels is lowered correspondingly to a reduction in gripping force of the front wheels, the steering front wheel is prevented or significantly restricted from locking up, preventing the vehicle from losing attitude stability.

The control system may cause the braking system to apply braking force, not beyond the braking force applied to the inner front wheel, independently to a rear wheel at an inner side of the cornering path to impart a yaw moment to the vehicle when the extent of relief of tendency toward understeering of the vehicle is less than a specified extent while the braking system applies braking force to the inner front wheel. Otherwise, the control system may cause the braking system to apply braking force, not beyond the braking force applied to the inner front wheel, independently to both a front wheel at an outer side of the cornering path and a rear wheel at the inner side of the cornering path to impart a yaw moment to the vehicle when the extent of relief of tendency toward understeering of the vehicle is less than a specified extent while the braking system applies braking force to the inner rear wheel.

When the tendency toward understeering of the vehicle is relieved to an extent only less than a specified extent while the braking system applies braking force to the inner front wheel, braking force is further supplied to a rear wheel at the inner side of the cornering path to impart a yaw moment for rectification of the running attitude of the vehicle toward the inner side of the cornering path, which relieves the tendency for the vehicle toward understeering. In this instance, because the braking force applied to the inner ear wheel is equal to or less than the braking force applied to the inner front wheel, the inner rear wheel, which is a steering wheel, is prevented or significantly restrained from locking up, preventing the vehicle from losing attitude stability. Further, when the extent of relief of tendency toward understeering is less than a specified extent while the braking system applies braking force to the inner rear wheel, braking force is further applied to both front wheel at the outer side of the cornering path and rear wheel at the inner side of the cornering path on a diagonal line to impart decelerating force to the vehicle which opposes centrifugal force developed in the vehicle, so as to relieve the tendency for the vehicle toward understeering. In this instance, because the braking force applied to the wheels on a diagonal line is equal to or less than the braking force applied to the inner front wheel, the wheels on the diagonal line are restrained from locking up, preventing the vehicle from losing attitude stability. The application of braking force to the right and left wheels forces the vehicle to decelerate without imparting a yaw moment to the vehicle in excess. As a result, while the vehicle receives a yaw moment to relieve the tendency toward understeering, the vehicle can decelerate.

BRIEF DESCRIPTION OF THE DRAWINGS

The foregoing and other objects and features of the present invention will be clearly understood from the following detailed description of preferred embodiments when read in conjunction with the accompanying drawings in which.

DETAILED DESCRIPTION OF THE PREFERRED EMBODIMENT

Figure 1:
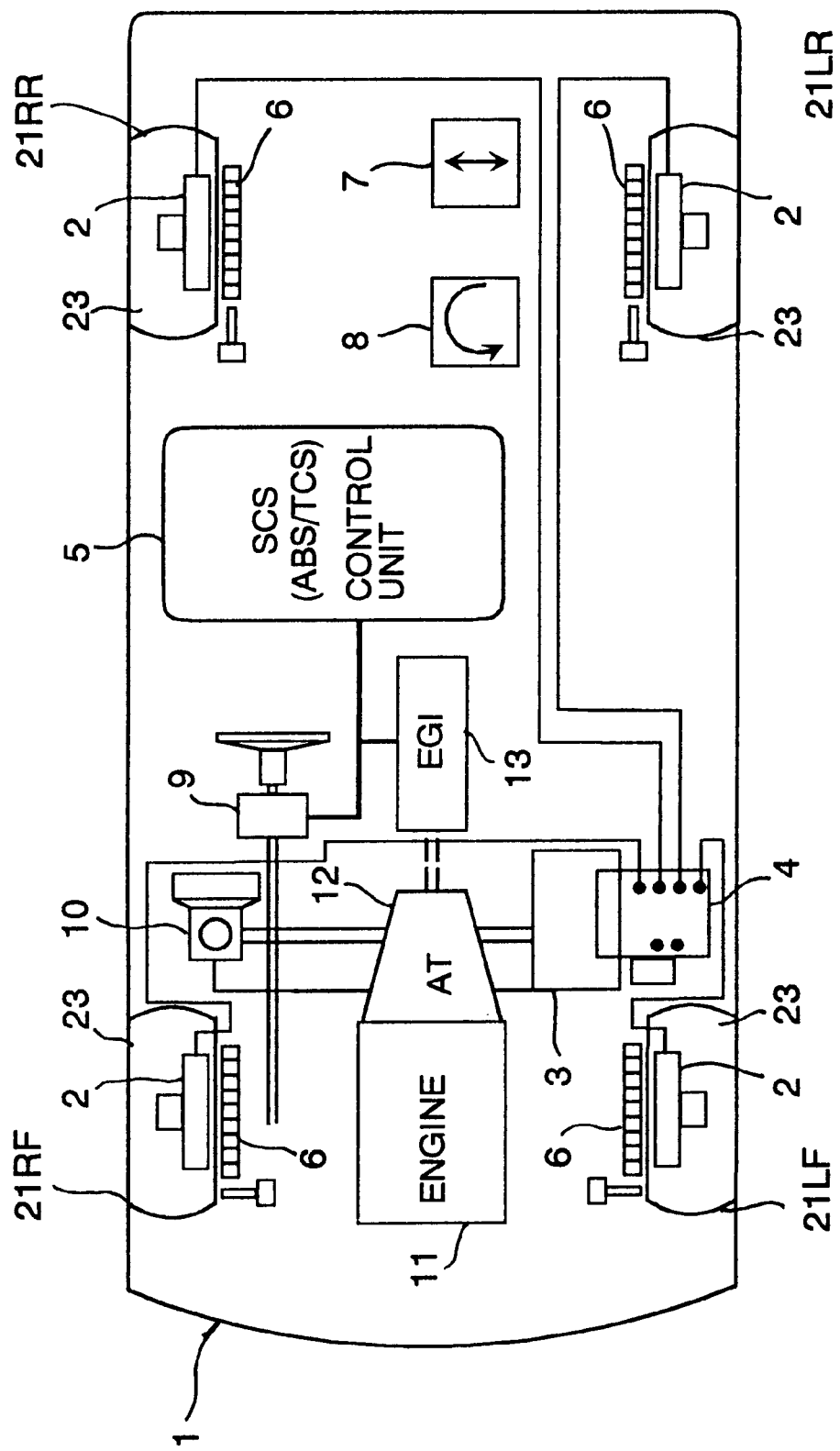
FIG. 1 is a schematic illustration showing an automotive vehicle equipped with a stability control system in accordance with an embodiment of the invention.

Referring to the drawings in detail and, in particular, to FIG. 1 showing an automotive vehicle equipped with a stability control system (SCS) in accordance with an embodiment of the invention, the automotive vehicle 1 has an engine 11 to which an automatic transmission 12 is connected and a braking system accompanied by a brake master cylinder 10. This braking system comprises hydraulic brake units 2 related to wheels 21RF, 21LF, 21RR and 21LR, respectively, and a pressure applying unit 3 for hydraulic pressure to each brake unit 2 through a pressure distribution unit 4. The respective brake units 2 are controlled by a stability control unit 5 through the pressure applying unit 3 and the pressure distribution unit 4 based on signals from wheel speed sensors 6 for detecting rotational speeds of the respective wheels 21RF, 21LF, 21RR and 21LR, a acceleration sensor 7 for detecting lateral gravitational acceleration of the vehicle 1, a yaw rate sensor 8 for detecting a yaw rate of the vehicle and an angle sensor 9 for detecting a steering angle. A fuel injection control unit (EGI) 13 is installed to control the amount of fuel to be injected according to engine speed and load.

Figure 2:
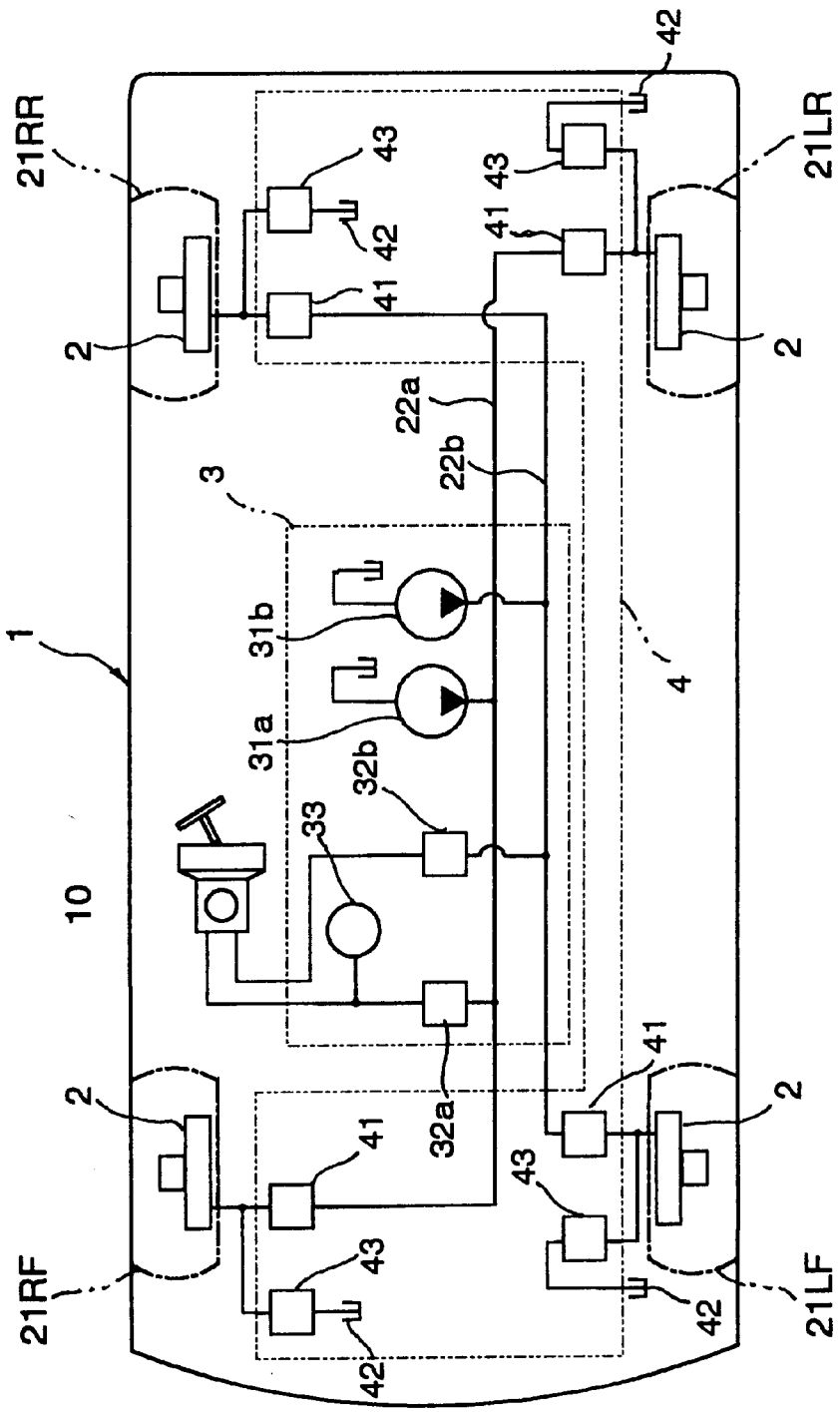
FIG. 2 is a braking pressure line installed to the automotive vehicle shown in FIG. 1.

Referring to FIG. 2 showing a braking pressure line, the braking system has what is called a cross-piping type of independent brake arrangement. Specifically, the brake units 2 related to the right front wheel 21RF and the left rear wheel 21LR respectively are connected to the brake master cylinder 10 through a first hydraulic line 22a. Similarly, the brake units 2 related to the left front wheel 21LF and the right rear wheel 21RR respectively are connected to the brake master cylinder 10 through a second hydraulic line 22b. The braking system applies braking force to the wheels 21RF, 21LR, 21RR and 21LR according to strokes of a brake pedal 14 stepped on by the driver. The pressure applying unit 3 includes hydraulic pumps 31a and 31b connected respectively to the first and second hydraulic lines 22a and 22b, shut-off valves 32a and 32b disposed respectively in the first and second hydraulic lines 22a and 22b to connect and disconnect the hydraulic pumps 31a and 31b from the brake master cylinder 10, and hydraulic sensor 33 to detect pressure between the brake master cylinder 10 and the shut-off valve 32a. The stability control unit 5 controls the shut-off valves 32a and/or 32b to close to disconnect the brake master cylinder 10 from the first and second hydraulic lines 22a and 22b, permitting hydraulic pressure developed by the hydraulic pumps 31a and 31b to be applied to the brake units 2 through the pressure distribution unit 4 independently from stepping on the brake pedal 14. The pressure distribution unit 4 includes a pressure applying valve 41 and a pressure relief valve 43 related to each respective brake unit 2. The pressure applying valve 41 applies hydraulic pressure to the brake unit 2 through the first or second hydraulic line 22a or 22b. The pressure relief valve 43 releases hydraulic pressure into a reservoir tank 42 from the brake unit 2. Hydraulic pressure remaining applied to the brake unit 2, and hence braking force applied to the wheel, is controlled by regulating the valve opening of the pressure applying valve 41 or of the pressure relief valve 43 by the stability control unit 5.

The stability control unit 5 determines an attitude of the vehicle 1 based on incoming signals from the sensors, namely wheel speed sensors 6, a lateral gravity sensor 7, a yaw rate sensor 8 and a steering angle sensor 9, which are known in various types in the art, and controls operations of the pressure applying unit 3 and the pressure distribution unit 4 based on the determined attitude to applies braking force to the wheels 21RF, 21LF, 21RR and 21LR independently. The stability control unit 5 further controls operations of the pressure applying unit 3 and the pressure distribution unit 4 according to the stroke of the brake pedal 14 which is detected based on an incoming signal from the hydraulic sensor 33 which indicates braking pressure P. That is, the stability control unit 5 performs the stability control for relieving a tendency for the vehicle to understeering or oversteering through the independent control of braking force to the wheels 21RF, 21LF, 21RR and 21LR so as thereby to direct the vehicle toward the target direction.

Figure 3:
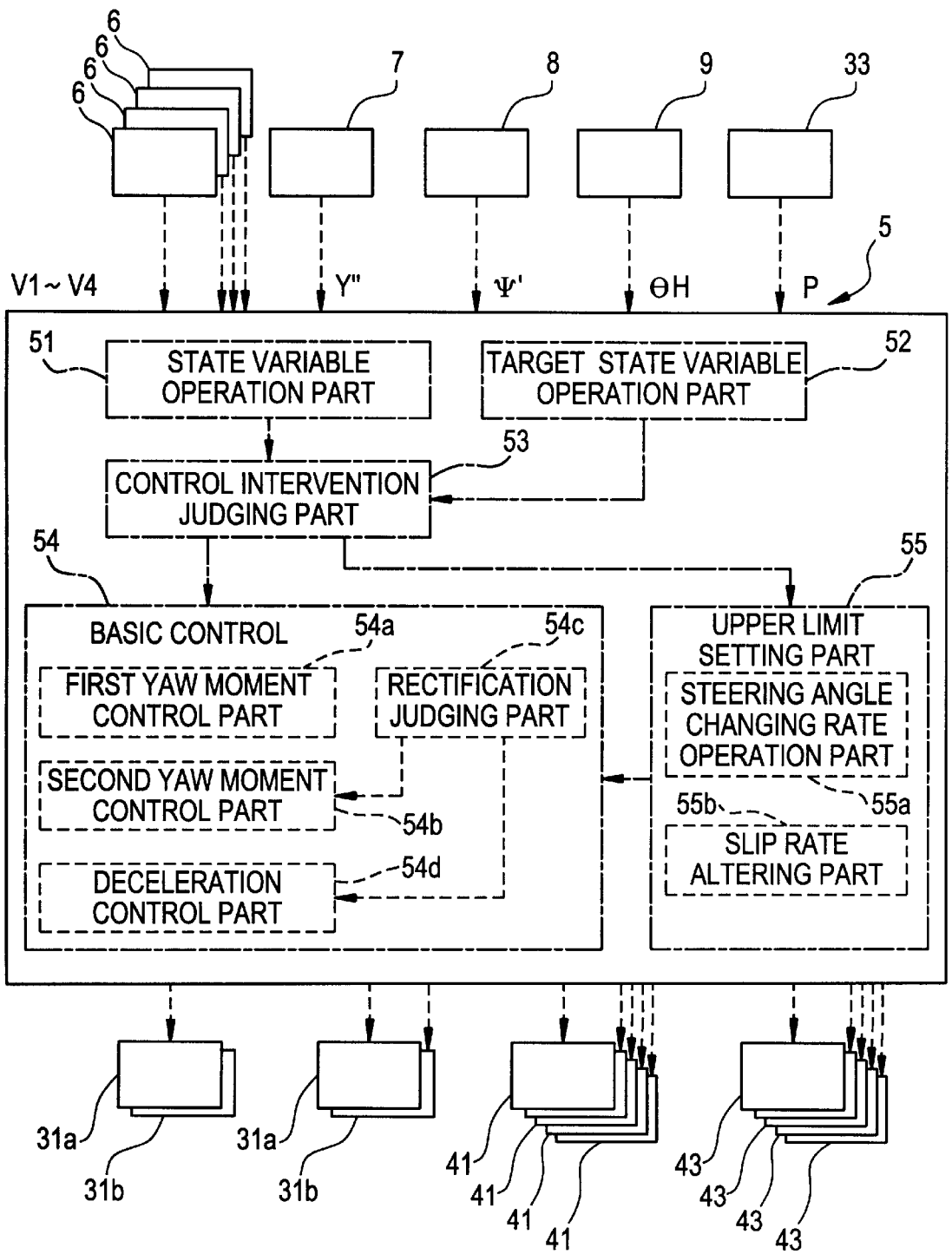
FIG. 3 is a block diagram of a stability control unit.

As shown in FIG. 3, the stability control unit 5 comprises a microcomputer functionally divided into various functional parts including an attitude variable operation functional part 51, a target attitude variable operation functional part 52, a control intervention judging functional part 53 which serves as an functional part of judging an occurrence of understeering, a basic control functional part 54 and an upper limit setting functional part 55. The attitude variable operation functional part 51 calculates a vehicle attitude of the vehicle 1 as an attitude variable with respect to the running direction based on incoming signals from the sensors 6–9. Similarly, the target attitude variable operation functional part 52 calculates a target attitude variable with respect to the target direction intended by the driver. The control intervention judging functional part 53 makes a judgement as to whether the control is needed to intervene based on the deviation between the attitude variable and target variable caused due to a strong tendency to oversteering or understeering. The basic control functional part 54 relieves a tendency for the vehicle 1 to oversteering or understeering by differently applying braking force to the wheels 21RF, 21LF, 21RR and 21LR according to the result of the judgement made at the control intervention judging functional part 53. Specifically, the basic control functional part 54 is comprised of four sub-control parts, namely a first yaw moment controlling sub-functional part 54a for imparting a yaw moment to the vehicle 1 by applying either one of the front wheels 21RF and 21LF, a second yaw moment controlling sub-functional part 54b for imparting a yaw moment to the vehicle 1 by applying either one of the rear wheels 21RR and 21LR, a judging subfunctional part 54c for judging the extent of relief of understeering or oversteering resulting from the yaw moment control, and a deceleration controlling sub-functional part 54d for applying braking force to both inner front wheel 21RF or 21LF and outer rear wheel 21RR or 21LR during cornering. The upper limit setting functional part 55 provides an upper limit of slip ratio for each wheel 21RF, 21LF, 21RR or 21LR in order to restrict braking force applied to each wheel through the basic control. Specifically, the upper limit setting functional part 55 is comprised of a steering speed operating sub-part 55a for differentiating the steering angle θH' to obtain a steering angle changing rate θH' and a slip ratio altering sub-part 55b for altering each upper limit of slip ratio based on these steering angle θH' and steering angle changing rate θH'.

The stability control unit 5 further performs, in addition to the stability control, anti-skid braking control in which an occurrence of brake lock is prevented by controlling braking force applied to the wheels 21RF, 21LF, 21RR and 21LR and traction control in which an occurrence of wheel racing is prevented by controlling drive torque applied to the wheels 21FR, 21FL, 21RR and 21RL.

Figure 4:
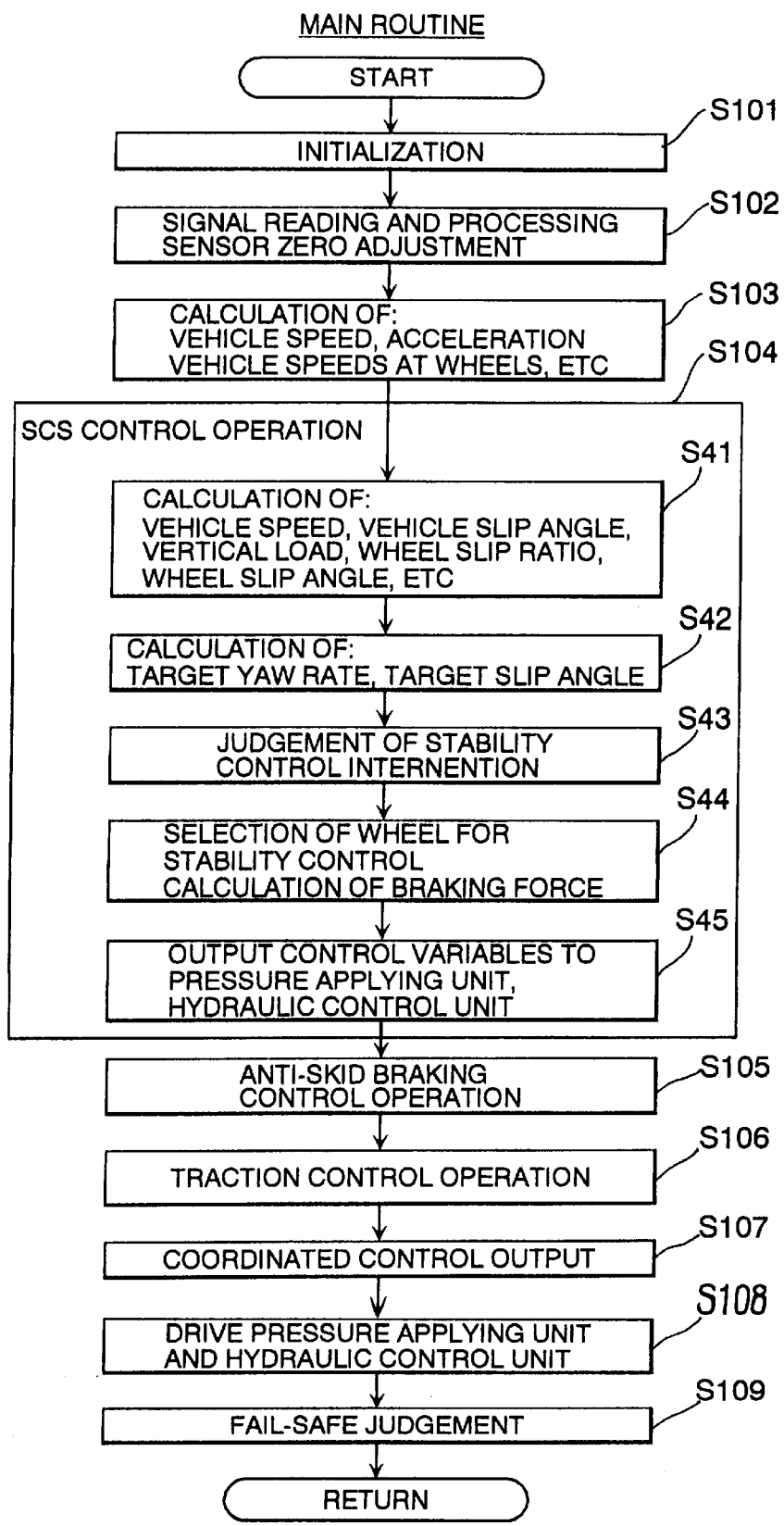
FIG. 4 is a schematic block diagram showing an operation unit for calculations of actual and target values regarding a vehicle attitude.

Referring to FIG. 4, which is a flow chart illustrating the basic stability control sequence routine, when an ignition switch (not shown) is turned on, the flow chart logic commences and control passes directly to step S101 where various values are initialized. Subsequently, after zero adjustment of the sensors 6–9 and 33, signals from the sensors 7–9 and 33 are input to the stability control unit 5 at step S102. According to incoming signals, calculations are made to obtain a vehicle speed, a vehicle deceleration and vehicle speeds at the respective wheels as vehicle attitude variables commonly necessary for various controls including the anti-skid braking control, the stability control and the traction control at step S103. Thereafter, operation for the stability control are executed at step S104 which includes sub-steps S41 through S45. Specifically, calculations are made to find a vehicle speed Vscs, a slip angle β of the vehicle, a slip ratio ρ1, ρ2, ρ3, ρ4 and a slip angle of each wheel, a vertical load of each wheel, a tire load factor and a road surface friction coefficient at step S41 and to find a target yaw rate ψ'TR and a target slip angle βTR at step S42. Subsequently, at step S43, a judgement is made based on the given vehicle attitude variables as to whether there is a necessity for an intervention of drift-out restraint control or spin restraint control which will be described later. If the control intervention is needed, selection of one or more wheels to be braked and a calculation is made to determine the strength of braking force to be applied to each selected wheel at step S44. Finally, openings of the pressure applying valve 41 and the pressure relief valves 43 are calculated to provide the braking force to be applied to each brake unit 2 at step S45.

Subsequently to the stability control operation at step S104, operations for the anti-skid braking control and operation for the traction control are consecutively made at steps S105 and S106, respectively. The results of operations for these three controls are coordinated in a prescribed manner to determine control variables for the pressure applying unit 3 and the pressure distribution unit 4 at step S107. In the event where the anti-skid braking control has taken when the stability control is tried, the anti-skid braking control variable are corrected based on the stability control variable to continue the anti-skid braking control in preference to the stability control. Further, in the event where the traction control has taken when the stability control is tried, the pressure applying unit 3 and the pressure distribution unit 4 are interrupted in operation to execute the stability control.

The pressure applying unit 3 and the pressure distribution unit 4 are driven according to the coordinated control variables to adjust openings of the pressure applying valve 41 and the pressure relief valves 43 to regulate braking force applied to each brake unit 2 at step S108. Finally, at step S109, a fail-safe routine is performed to monitor operations of the pressure applying valve 41 and the pressure relief valves 43. If errors or faults are found, the flow chart logic suspends the stability control and orders return.

Figure 5:
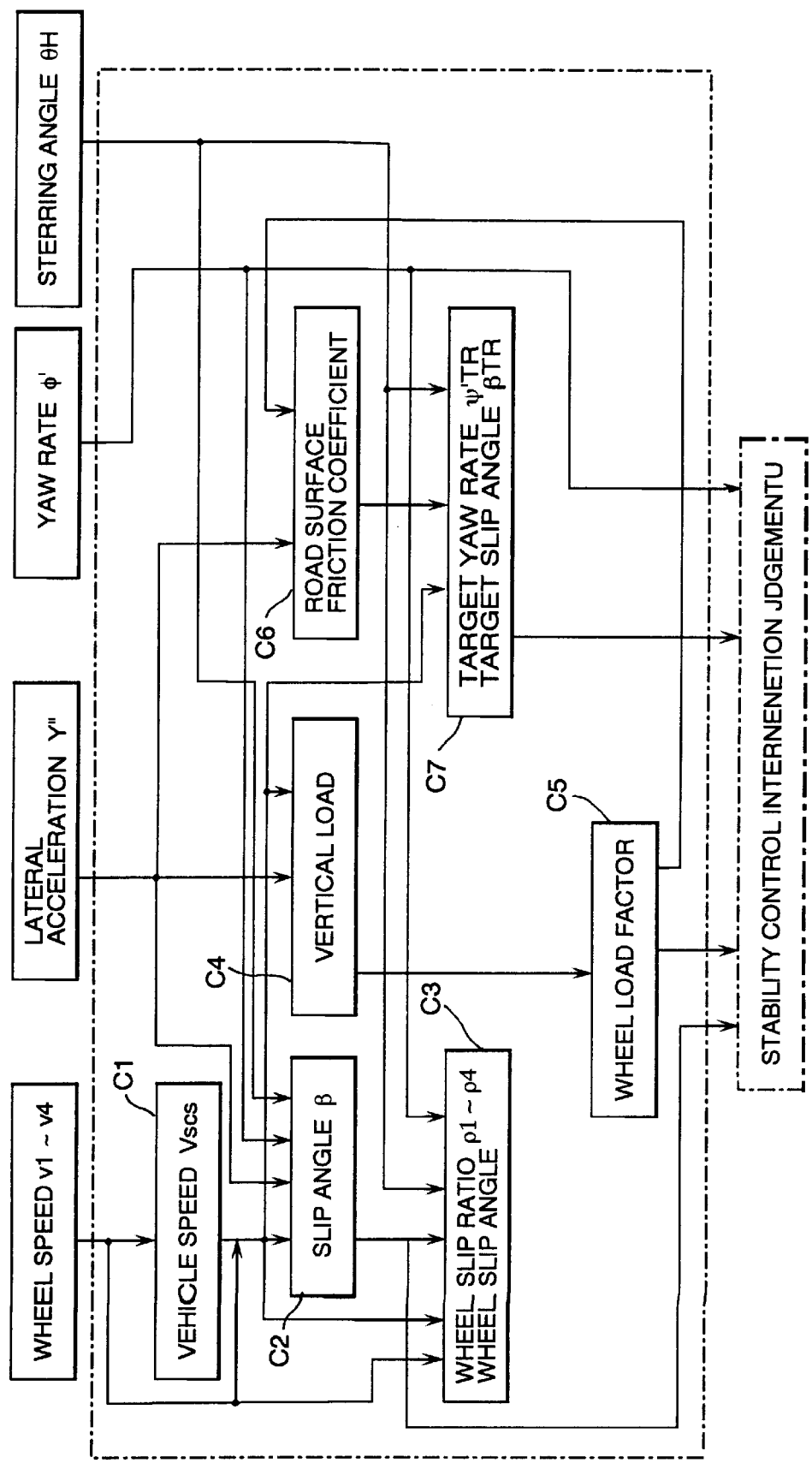
FIG. 5 is a flow chart illustrating a stability control main routine.

FIG. 5 is a block diagram showing operation of actual and target vehicle attitude variables made at steps S41 and 42 in the main control sequence routine shown in FIG. 4.

As shown, a vehicle speed Vscs is calculated based on respective wheel speeds v1, v2, v3, v4 of the wheels 21RF, 21LF, 21RR and 21LR detected by the respective wheel speed sensors 6 at block C1. A slip angle β of the vehicle 1 is subsequently calculated based on the wheel speeds v1–v4, the vehicle speed Vscs, a lateral gravitational acceleration Y" detected by the gravity sensor 7, a yaw rate ψ' detected by the yaw rate sensor 8 and a steering angles θH detected by the steering angle sensor 9 at block C2. A wheel slip ratio ρ1, ρ2, ρ3, ρ4 and a wheel slip angle of each wheel 23RF, 23LF, 23RR, 23LR are calculated based on the wheel speed v1, v2, v3 and v4, the vehicle speed Vscs, the yaw rate ψ', the slip angle β and the steering angles θH at block C3. A vertical load on each wheel is calculated based on the wheel speeds v1, v2, v3, v4 and the lateral gravitational acceleration Y" at block C4. A ratio of the present tire gripping or adhesion force relative to the rated tire gripping or adhesion force of each wheel is calculated as a tire load factor based on the vertical load and the wheel slip ratio ρ1, ρ2, ρ3, ρ4 at block C5. Further, a road surface friction coefficient is calculated based on the lateral gravitational acceleration Y" and the tire load factors at block C6. A target yaw rate ψ'TR and a target slip angle βTR are calculated based on the road surface friction coefficient, the vehicle speed Vscs and the wheel steering angles steering angles θH at block SC7.

Figure 6:
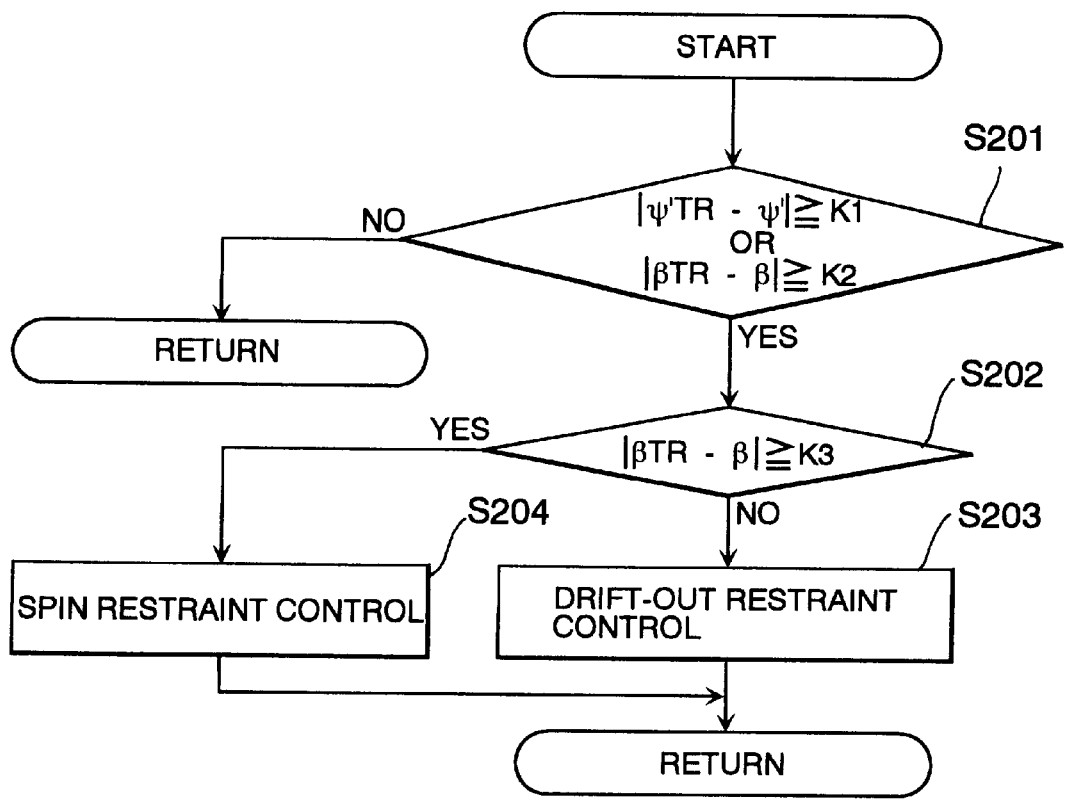
FIG. 6 is a flow chart illustrating a control intervention judging sequence routine.

FIG. 6 is a flow chart illustrating the control intervention judgement subroutine. When the control logic commences and control proceeds directly to a judgement at step S201 where a yaw rate deviation|ψ'TR−ψ'| and a slip angle deviation |βTR−β| are compared with intervention threshold valves k1 and k2, respectively. When the yaw rate deviation of a target yaw rate ψ'TR from an actual yaw rate −' is greater than the intervention threshold valve k1, or when the slip angle deviation of a target slip angle βTR from an actual slip angle β is greater than the intervention threshold valve, this indicates that the deviation of vehicle attitude is increasing with respect to the target direction and a control intervention is needed, then, another judgement is made at step S202 as to whether the slip angle deviation is greater than a threshold value K3, greater than the threshold value K2, for judging the necessity of executing the spin restraint control. When the answer is negative, it is considered that the vehicle has a tendency to understeering, then, the drift-out restraint control is executed at step S203. As will be described in detail later, in the drift-out restraint control, the tendency toward understeering is restrained by imparting a relatively small yaw moment to the vehicle 1 so that the vehicle 1 turns toward the inner side of the actual cornering path thereof by imparting a relatively small raw moment and consequently forces the yaw rate ψ' to converge to the target yaw rate ψ'TR following the driver's driving operation. On the other hand, when the slip angle deviation is greater than a threshold value K3, this indicates that the vehicle 1 is on the verge of spinning, then, as will be described in detail later, the spinning restriction control is executed by imparting a relatively large yaw moment to the vehicle 1 so as to force the vehicle 1 to turn toward the outside of the actual cornering path at step S204.

Figure 7:
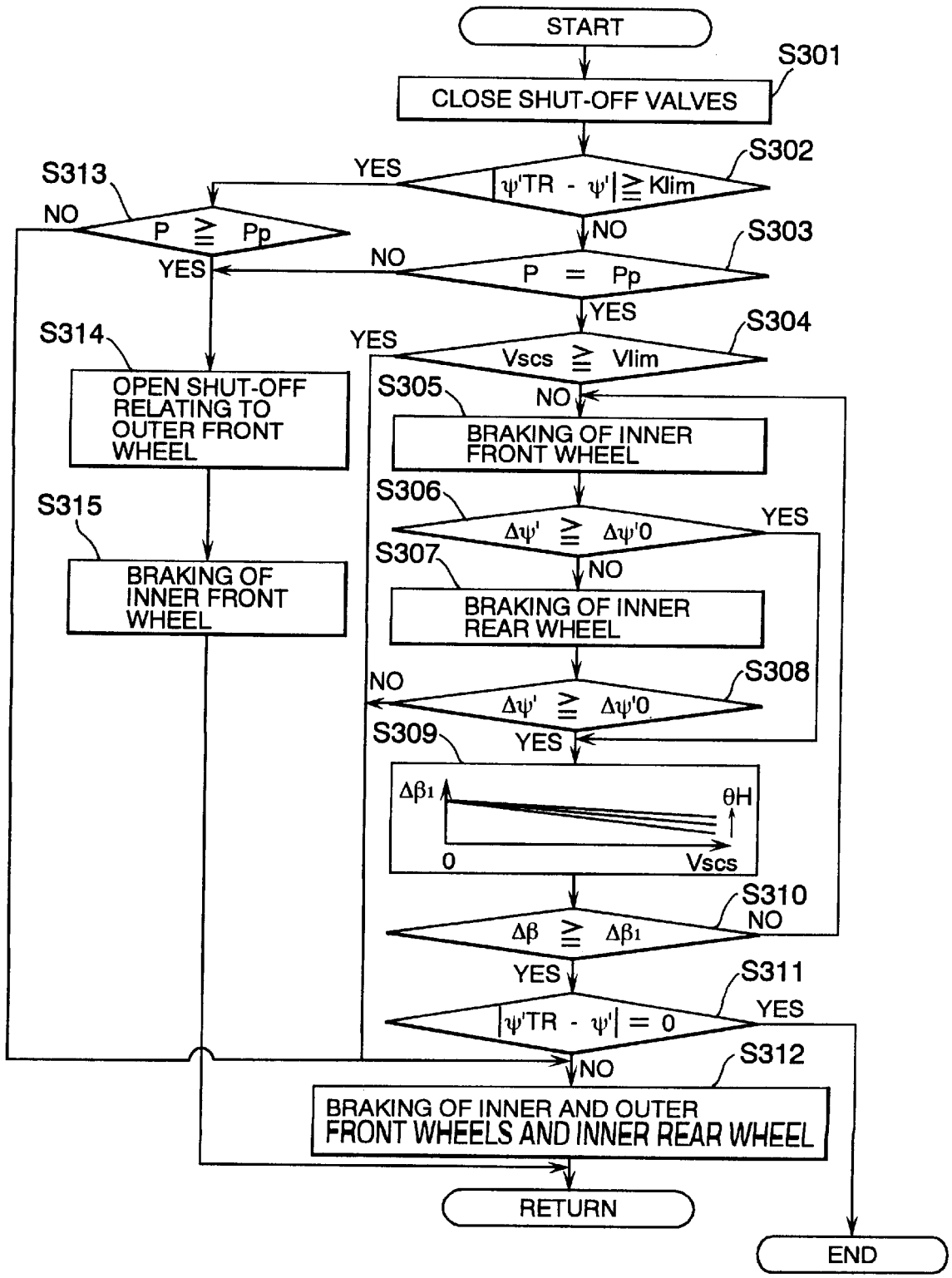
FIG. 7 is a flow chart illustrating a drift-out restraint control sequence routine.

FIG. 7 is a flow chart illustrating the drift-out restraint sequence subroutine, which is executed when the vehicle 1 is judged to be in the event where the vehicle 1 is on the verge of drifting as shown by (a) in FIG. 7. When the flow chart logic commences and control proceeds directly to a function block at step S301 where the shut-off valves 32a and 32b are closed. Thereafter, the yaw rate deviation |ψ'TR−ψ'| is compared with a threshold value Klim specified to make a judgement as to whether rectification of the vehicle attitude is within the bound of possibility at step S302. When the answer to the judgement is negative, another judgement is made at step S303 as to whether a braking pressure P is equal to the atmospheric pressure Po. When the answer is affirmative, this indicates that the brake pedal 14 remains released, then, at step S304, the vehicle speed Vscs is compared with a threshold speed Vlim specified to make a judgement as to whether rectification of the vehicle attitude is within the bound of possibility. When the answer is negative, one of the front wheels 21RF and 21LF at the inner side of the cornering path (the left front wheel 21LF in the case shown in FIG. 8) is applied with braking force corresponding to the yaw rate deviation |ψ'TR−ψ'| so as to provide a wheel slip ratio ρ2 less than a first upper limit of wheel slip ratio ρlim1 which will be described later and pull the vehicle 1 toward the inner side of the path at step S305 as shown by (b) in FIG. 8. That is, backward force is imparted to the vehicle 1 at the inner side of the cornering path to cause a yaw moment in the vehicle 1 so as to head the vehicle 1 toward the inner side of the path, thereby relieving the tendency for the vehicle to understeering. The first upper limit of wheel slip ratio ρlim1 is established such that the front left wheel 21LF can afford to cause lateral force with a margin of tire gripping force so as to restrain an occurrence of locking the front left wheel 21LF.

Figure 8:
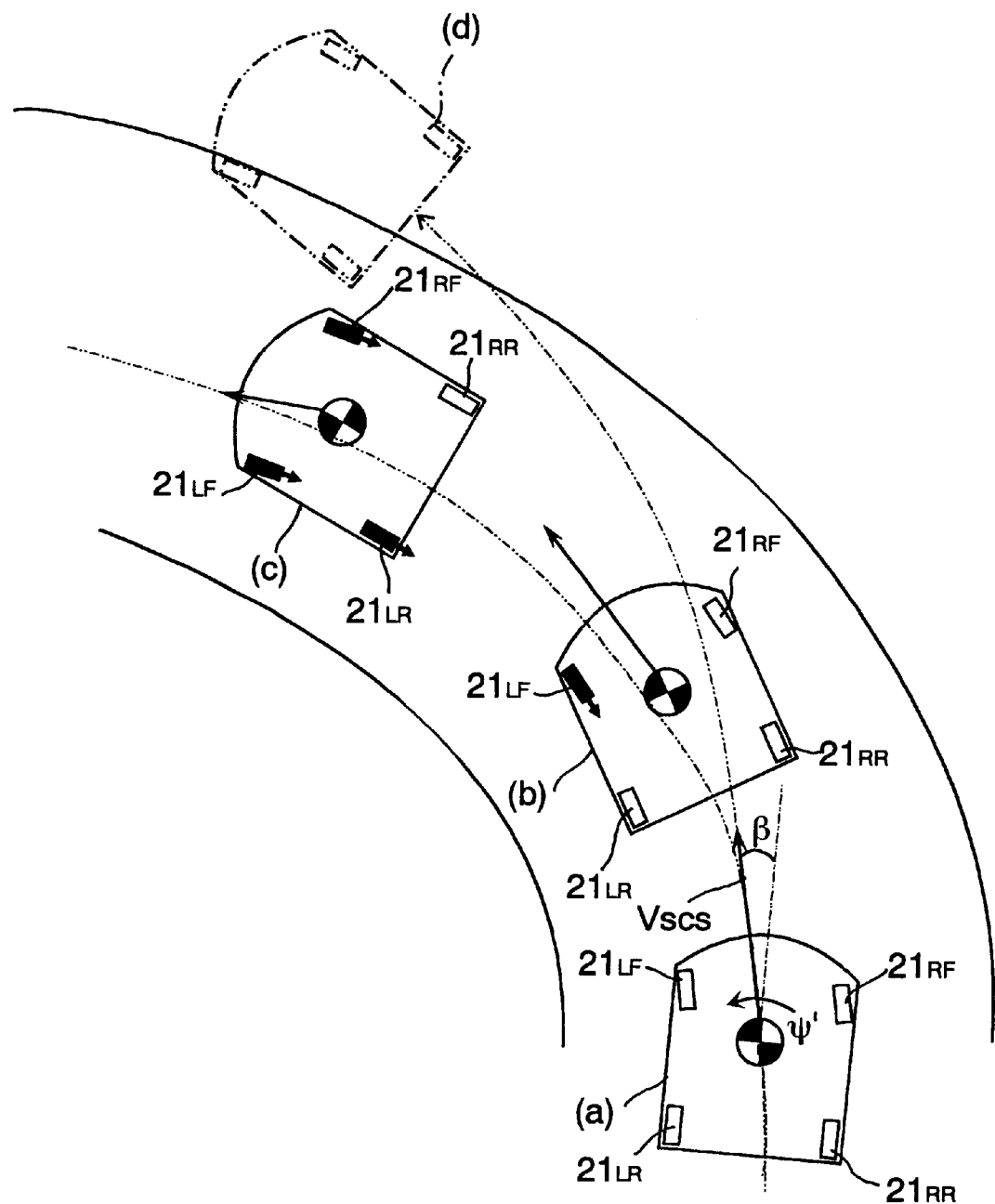
FIG. 8 is an illustration showing drift-out restraint control.

Further, a yaw rate changing rate Δψ' is compared with a reference yaw rate changing rate Δψ'0 to judge the extent of relief of the understeering at step S306. When the extent of relief of understeering is less than the reference yaw rate changing rate Δψ'0, it is considered that a yaw moment imparted to the vehicle 1 is too small to relieve the tendency to understeering to a desired extent, then, one of the rear wheels 21RR and 21LR at the inner side of the cornering path (the left rear wheel 21RF when cornering left as shown in FIG. 8) is applied with braking force so as to provide a wheel slip ratio ρ4 of a 90% of the wheel slip ratio ρ2 of the left front wheel 21LF at step S307. Subsequently, a yaw rate changing rate Δψ' is compared again with the reference yaw rate changing rate Δψ'0 again but after the rear wheel braking to judge the extent of relief of the tendency toward understeering at step S308. When the tendency toward understeering is relieved to a desired extent greater the reference yaw rate changing rate Δψ'0, a first reference slip angle changing rate Δβ1 is varied according to the vehicle speed Vscs and the steering angle θH by reading a reference slip angle changing map at step S309. On the other hand, when the tendency toward understeering is relieved more that the reference changing rate Δψ'0, this indicates that the vehicle 1 receives a sufficient yaw moment to relieve the tendency to understeering to a sufficient extent as a result of application of the braking force to the left front wheel 21LF, then, the first reference slip angle changing rate Δβ1 is varied without braking the left rear wheel 21LR at step S309. The reference slip angle changing rate Δβ1 is used to judge whether the vehicle 1 has sufficiently rectified in attitude toward the inner side of the cornering path. The first reference slip angle changing rate Δβ1 defined in the reference slip angle changing map becomes smaller with an increase in vehicle speed Vscs and, however, becomes larger with an increase in steering angle θH.

After varying the reference slip angle changing rate Δβ1 according to the vehicle speed Vscs and the steering angle θH at step S309, the slip angle changing rate Δβ is compared with the first reference slip angle changing rate Δβ1 at step S310. When the slip angle changing rate Δβ is less than the first reference slip angle changing rate Δβ1, this indicates that the vehicle 1 has not yet changed its attitude sufficiently, the left front wheel 21LF or both left front and left rear wheels 21LF and 21LR are applied with braking force through steps S305–S308 so as to further pull the vehicle 1 toward the inner side of the cornering path. On the other hand, when the slip angle changing rate Δβ is equal to or greater than the first reference slip angle changing rate Δβ1, it is considered that the vehicle 1 has changed its attitude sufficiently inward, another judgement is made at step S311 as to whether the yaw rate deviation |ψ'TR−ψ'| is equal to zero. When the answer to the judgement is affirmative, this indicates that the vehicle 1 has gained the target yaw rate ψ'TR correspondingly to the driver's intention, then, the flow chart logic terminates the sequence routine. However, when the answer to the judgement is negative, braking force is further applied to the right front wheel 21RF at the outer side of the cornering path so as to provide a wheel slip ratio ρ1 of a 90% of the wheel slip ratio ρ2 of the left front wheel 21LF at step S312. As a result, braking force suitably corresponding to the yaw rate deviation |ψ'TR−ψ' is applied to the right front and rear wheels 21LF and 21LR and the right front wheel 21RF to imparting a yaw moment needed to relieve the tendency toward understeering, so as thereby preventing the vehicle 1 from drifting out of the corner as shown by (c) in FIG. 8.

When the answer to the judgement concerning the possibility of rectification of the vehicle attitude made at step S304 is affirmative, that is, when the vehicle speed Vscs is equal to or greater than the threshold speed Vlim, this indicates that the vehicle speed Vscs is too high to rectify the running attitude and has a demand for deceleration, braking force is applied to both left front and rear wheels 21LF and 21LR at the inner side of the cornering path and the right front wheel 21RF at the outer side of the cornering path at step S312. Also, when the answer to the judgement concerning the yaw rate changing rate Δψ' after having applied braking force to the left rear wheel 21LR at the inner side of the cornering path made at step S308 is negative, this indicates that the degree of relief of the tendency toward understeering is insignificant, braking force is further applied to the right front wheel 21RF at the outer side of the cornering path at step S312.

When the answer to the judgement concerning the yaw rate deviation |ψ'TR−ψ'| made at step S302 is negative, this indicates that rectification of the vehicle attitude is out of the bound of possibility, then another judgement is made at step S313 as to whether a braking pressure P is higher than a discharged pressure $P_p$ from the hydraulic pumps 31a and 31b. When the braking pressure P is equal to or higher than the discharged pressure $P_p$, it is considered that the driver steps on the brake pedal 14 with all his or her might, or when the answer to the judgement concerning the braking pressure P made at step S302 is negative, this indicates that the driver steps on the brake pedal 14 with intention to decelerate the vehicle 1, then, at step S314, the shut-off valve 32a in the brake line relating to one of the front wheels 21RF and 21LF, namely the left front wheel 21LF when the vehicle 1 is turning to the left, is opened to permit a hydraulic pressure developed by stepping on the brake pedal 14 to flow into the first hydraulic line 22a from the brake master cylinder 10, applying braking force corresponding to the stepped stroke of the brake pedal 14 to the right front wheel 21RL at the outer side of the cornering path and the left rear 21LR wheel at the inner side of the cornering path. Subsequently, at step S315, one of the front wheels 21RF and 21LF at the inner side of the cornering path is applied with braking force corresponding to the yaw rate deviation |ψ'TR−ψ'| and the braking pressure P so as to provide a wheel slip ratio ρ2 less than the first upper limit of wheel slip ratio ρlim1. When it is judged that rectification of the vehicle attitude is difficult and the brake pedal 14 is positively stepped on, while leaving the front wheel at the outer side of the cornering path and the rear wheel at the inner side of the cornering path in driver's care in order to prevent the vehicle from drifting-out of the corner the corner, appropriate braking force is applied to the front wheel at the inner side of the cornering path. At this time, the left front wheel 21LF at the inner side of the cornering path is applied with limited braking force, the wheel is restrained from locking.

Further, when the braking pressure P is less than the discharged pressure Po, this indicates that the brake pedal is stepped on only slightly, while appropriate braking force is applied to the left front wheel 21LF to impart a yaw moment to the vehicle 1 so as to restrain the tendency toward understeering, braking force is simultaneously applied to both right front wheel 21RF at the outer side of the cornering path and left rear wheel 21LR at the inner side of the cornering path to decelerate the vehicle 1. That is, in the event where, although it is judged that rectification of the vehicle attitude is difficult, the brake pedal 14 is stepped on only slightly, the discharged pressure from the hydraulic pumps 31a and 31b are applied to the related hydraulic brake units 2 to forcibly brake the right and left front wheels 21RF and 21LF and the left rear wheel 21LR, bringing the vehicle into deceleration.

Figure 9:
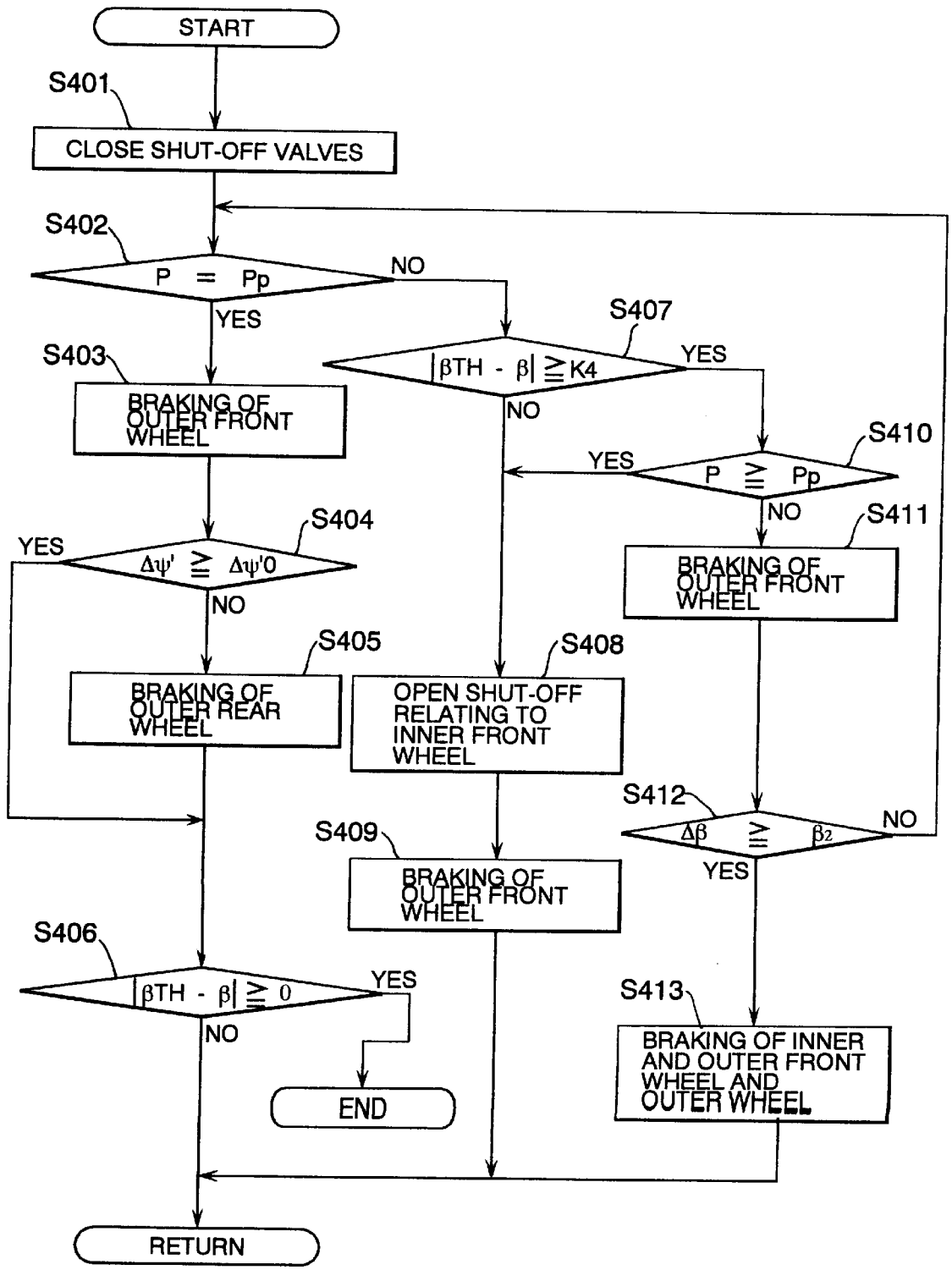
FIG. 9 is a flow chart illustrating a spin restraint control sequence routine.

FIG. 9 is a flow chart illustrating the spin restraint control sequence executed at step S204 in the control intervention judgement subroutine.

Figure 10:
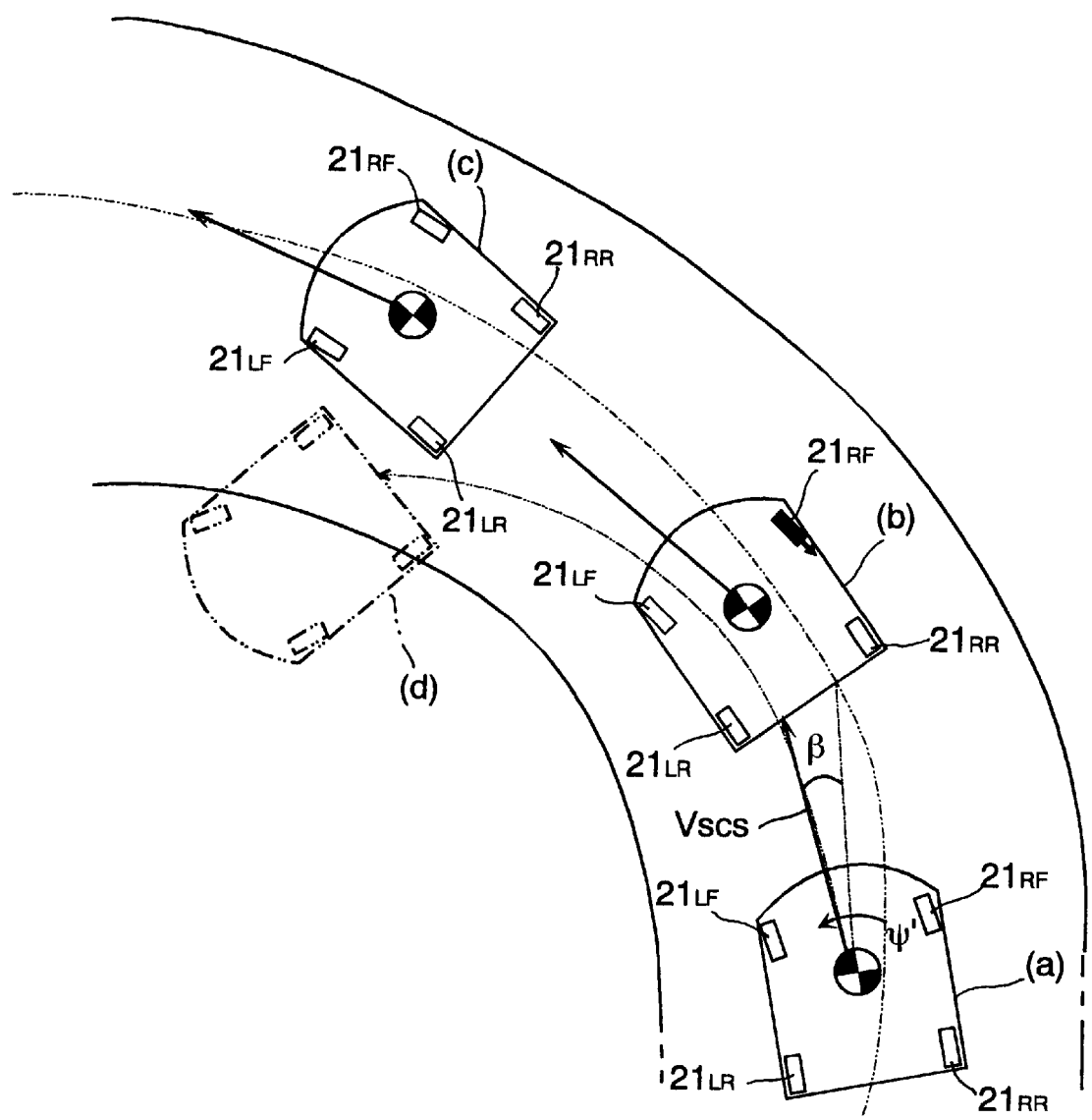
FIG. 10 is an illustration showing spin restraint control.

In the event where there is an intensified tendency toward oversteering as much as necessary to execute the spin restraint control as shown by (a) in FIG. 10, after closing the shut-off valve 32a and 32b at step S401, the braking pressure P is compared with the atmospheric pressure Po at step S402. When the braking pressure P is equal to the atmospheric pressure Po, i e. the brake pedal 14 remains released, then, one of the front wheels 21RF and 21LF, namely the right front wheel 21RF when the vehicle 1 turns left for example, is applied with relatively large braking force meeting the slip angle deviation |βTH−β| from a target slip angle βTR from an actual slip angle β so as to provide a wheel slip ratio ρ1 of the left front wheel 21LF below a second upper limit of wheel slip ratio ρlim2 (which will be described later) at step S403 as shown by (b) in FIG. 10. That is, backward force is imparted to the vehicle 1 at the outer side of the cornering path to cause a yaw moment in the vehicle 1 so as to head the vehicle 1 toward the outer side of the path, thereby relieving the tendency toward understeering. The second upper limit of wheel slip ratio ρlim2 is established such that the front right wheel 21RF can afford to cause lateral force with a margin of tire gripping so as to restrain an occurrence of locking the front right wheel 21RF. Subsequently, a yaw rate changing rate Δψ' is compared with the reference yaw rate changing rate Δψ'0 to judge the extent of relief of the understeering at step S404. When the answer is negative, it is considered that a yaw moment imparted to the vehicle 1 is too small to relieve the tendency toward understeering to a desired extent, then, at step S405, one of the right rear wheels 21RR and 21LR at the outer side of the cornering path, namely the right rear wheel 21RR when cornering left as shown in FIG. 10, is applied with slight braking force to cause a yaw moment in the vehicle 1 so as to head the vehicle 1 toward the outer side of the path for relief the tendency toward oversteering and preventing the vehicle from a spin. When the yaw rate changing rate Δψ' is larger the reference yaw rate changing rate Δψ'0 step S404 or after the right rear wheel 21RR has been applied with slight braking force at step S405, a judgement is made at step S406 as to whether the slip angle deviation |βTH−β| from a target slip angle βTR from an actual slip angle β is greater than zero to find whether the vehicle 1 has been directed to the target direction. When the slip angle division IβTH−βI is greater than zero, this indicates that the vehicle 1 has been directed to the target direction as shown by (c) in FIG. 10, the flow chart logic terminates the spin control sequence routine. On the other hand, when the slip angle deviation |βTH−β| is still greater than zero, the flow chart logic orders return.

When the brake pedal 14 is stepped on, i.e. the answer to the decision concerning the braking pressure P made at step S402 is negative, a judgement is made at step S407 as to whether the slip angle deviation |βTH−β| is greater than a threshold value K4 specified to judge the extent of oversteering. When the slip angle deviation |βTH−β| is smaller than the threshold value K4, this indicates that the tendency toward oversteering is less relieved, then, at step S408, the shut-off valve 32b in the brake line relating to one of the front wheels 21RF and 21LF, namely the left front wheel 21LF when the vehicle 1 is turning to the left, is opened to permit a hydraulic pressure developed by stepping on the brake pedal 14 to flow into the first hydraulic line 22b from the brake master cylinder 10, applying braking force corresponding to the stepped stroke of the brake pedal 14 to the left front wheel 21LF at the outer side of the cornering path and the right rear wheel 21RR at the outer side of the cornering path. Subsequently, at step S409, another front wheel, namely the right front wheel 21RF at the outer side of the cornering path is applied with braking force corresponding to the slip angle deviation |βTH−β| and the braking pressure P so as to provide a front wheel slip ratio ρ1 less than the second upper limit of wheel slip ratio ρlim2. Thereafter, the flow chart logic orders return.

When the slip angle deviation |βTH−β| is equal to or greater than the threshold value K4, this indicates that the tendency toward oversteering is significantly relieved, then, at step S410, another judgement is made at step as to whether a braking pressure P is equal to the atmospheric pressure Po. When the braking pressure P is equal to the atmospheric pressure Po or greater than the atmospheric pressure Po which indicates that there is a strong demand for deceleration, then, the shut-off valve 32b in the brake line relating to the left front wheel 21LF is opened to apply braking force corresponding to the stepped stroke of the brake pedal 14 to the left front wheel 21LF and the right rear wheel 21RR at step S408 and, subsequently, the right front wheel 21RF is applied with braking force corresponding to the slip angle deviation |βTH−β| and the braking pressure P so as to provide a front wheel slip ratio ρ1 less than the second upper limit of wheel slip ratio ρlim2 at step S409. That is, when there is a strong demand for deceleration even though the vehicle 1 is still oversteering, the vehicle 1 is decelerated according to the drover's intention. On the other hand, the braking pressure P is lower than the atmospheric pressure Po, the right front wheel 21RF is applied with appropriate braking force meeting the slip angle deviaton |βTH−β| and the braking pressure P so as to provide a wheel slip ratio ρ1 of the left front wheel 21LF below the second upper limit of wheel slip ratio ρlim2 at step S411, as a result of which the vehicle 1 is directed right. Thereafter, at step S412, a slip angle changing rate Δβ is compared with a second reference slip angle changing rate Δβ2 specified to judge whether the vehicle 1 has rectified in attitude desirably to the right. When the slip angle changing rate Δβ is less than the second reference slip angle changing rate Δβ2, this indicates that the rectification of vehicle attitude is insufficient, then, the flow chart logic orders return to step S402 for another spin control. On the other hand, when the slip angle changing rate Δβ is greater than the second reference slip angle changing rate Δβ2, this indicates that a desired rectification of vehicle attitude has been achieved, then, braking force is applied to the right and left front wheels 21RF and 21LF and the right rear wheel 21RR are applied with appropriate braking force meeting the slip angle deviation |βTH−β| and the braking pressure P, decelerating the vehicle 1 while causing a raw moment to relief the tendency toward oversteering in the vehicle 1. That is, in the event where there is a somewhat strong tendency toward oversteering and the driver has, however, not so strong demand for deceleration, deceleration is made after the vehicle 1 has gained a stable driving attitude following rectification of the running direction.

Figure 11:
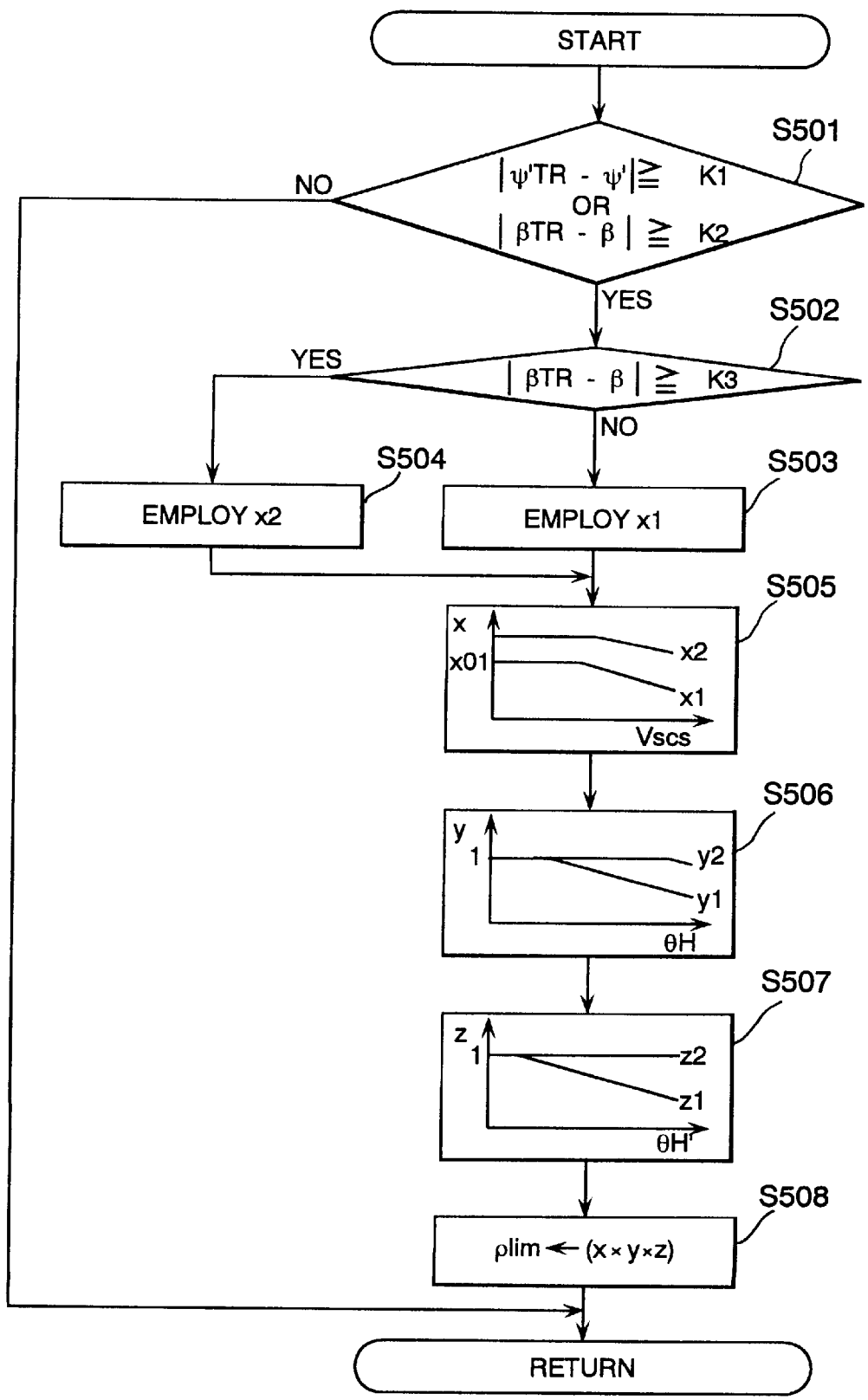
FIG. 11 is a flow chart illustrating a sequence routine for setting an upper limit of wheel slip ratio.

FIG. 11 is a flow chart illustrating the sequence routine of establishing the first and second upper limits of wheel slip ratio ρlim1 and ρlim2 used in the drift-out restraint control and the spin restraint control, respectively. These first and second upper limits of wheel slip ratio ρlim1 and ρlim2 are established by varying first or second basic upper limit of wheel slip ratio x1 or x2 variable according to steering angle θH and steering angle changing rate θH'. Specifically, at step S501 which corresponds to step S201 in the control intervention judgement subroutine, a yaw rate deviation |ψTR−ψ'| and a slip angle deviation |βTH−β| are compared with intervention threshold valves k1 and k2, respectively. When the yaw rate deviation |ψ'TR−ψ'| is less than the intervention threshold valve K1 and the slip angle deviation |βTR−β| is less than the intervention threshold valve k2, this indicates that there is no demand for a control intervention, then the flow chart logic orders return. On the other hand, when the yaw rate deviation |ψ'TR−ψ'| is equal to or greater than the intervention threshold valve K1 and/or the slip angle deviation |βTR−β| is equal to or greater than the intervention threshold valve k2, this indicates that there is a demand for a control intervention, then, at step S502 corresponding to step S202 in the control intervention judgement subroutine, a slip angle deviation |βTH−β| is compared with the threshold value K3. When the answer is negative, this indicates a demand for the drift-out restraint control, then, the first basic upper limit of wheel slip ratio x1, which takes a relatively small value so as to meet the drift-out restraint control, is selected at step S503. On the other hand, when the answer is affirmative, this indicates a demand for the spin restraint control, then, the second basic upper limit of wheel slip ratio x2 which takes a relatively large value so as to meet the spin restraint control, is selected at step S504. After the selection of either one of the first and second basic upper limit of wheel slip ratios x1 and x2, the basic upper limit of wheel slip ratio x1 or x2 variable according to vehicle speed Vscs is read from an upper limit of wheel slip ratio map at step S505. The first basic upper limit of wheel slip ratio x1 takes a constant initial value x01 for a range of lower vehicle speeds Vscs and becomes smaller as the vehicle speed Vscs increases. Similarly, the second basic upper limit of wheel slip ratios x2, which is always larger than the first basic upper limit of wheel slip ratios x1, takes a constant value greater than the initial value x01 for the range of lower vehicle speeds Vscs and becomes smaller as the vehicle speed Vscs increases. In this instance, in order for the wheels to provide sufficiently large longitudinal and lateral component force, the constant initial value x01 is established such as to be smaller by approximately 10% than a critical wheel slip ratio ρmax of, for example, 20%

Figure 12:
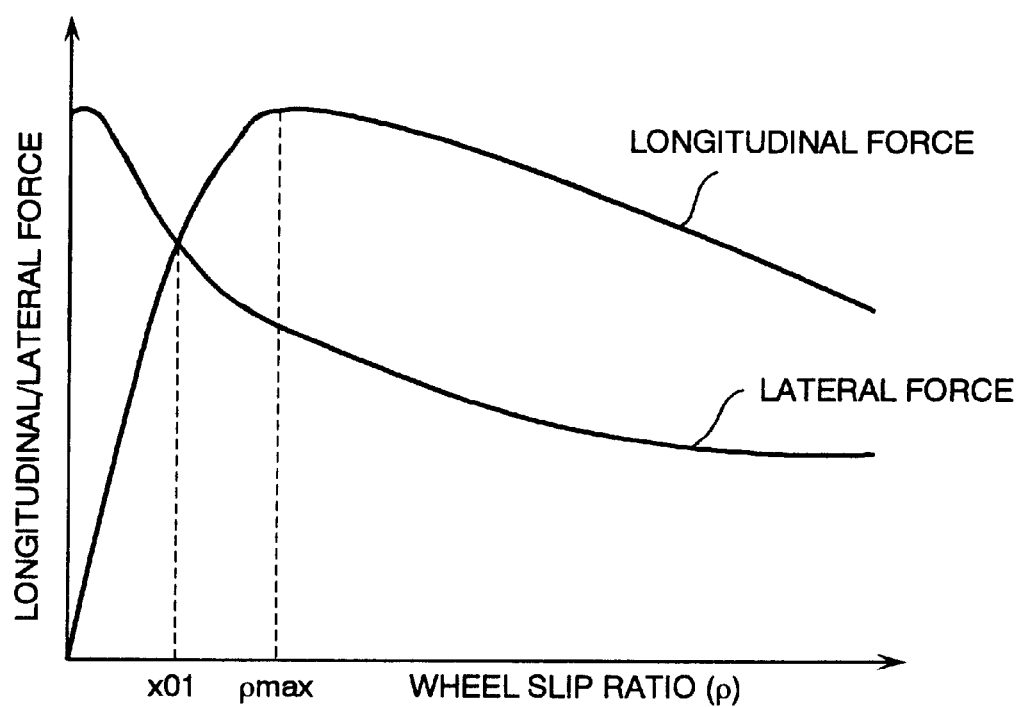
FIG. 12 is a diagram showing the relationship between longitudinal and lateral force of a wheel tire and wheel slip ratio.

FIG. 12 shows a general relationship of longitudinal and lateral component force that a wheel can provide with respect to wheel slip ratio ρ. As shown, the longitudinal component force of a wheel, which is zero when the wheel slip ratio ρ is zero, becomes larger sharply as the wheel slip ratio ratios p increases and takes a maximum value at the critical wheel slip ratio ρmax. However, the longitudinal component force of the wheel gradually drops as the wheel slip ratio ratios p further increases beyond the critical wheel slip ratio ρmax. The lateral component force of the wheel takes a maximum value when the wheel slip ratio ρ is zero and drops as the wheel slip ratio ρ drops. In the attitude where a wheel gains the maximum longitudinal component force at an occurrence of the critical wheel slip ratio ρmax, the lateral component force is too small to avoid an occurrence of locking of the wheel. In order for the wheel to provide the balanced longitudinal and lateral component force, it is preferred to set the initial value X01 to be smaller by approximately 10% than the critical wheel slip ratio ρmax.

Subsequently, at step S506, a first correction factor y1 for the drift-out restraint control or y2 for the spin restraint control is read from a first correction factor map. The first correction factor y1 takes a constant value of approximately 1.0 for a range of lower steering angles θH and becomes smaller as the steering angle θH increases. The first correction factor y2 takes a constant value of approximately 1.0 almost over the entire range of steering angles θH. Further, at step S507, a second correction factor z1 for the drift-out restraint control or z2 for the spin restraint control is read from a first correction factor map. The first correction factor y1 takes a constant value of approximately 1.0 for a range of lower steering angle changing rates θH', and becomes smaller as the steering angle changing rate θH' increases. The second correction factor z2 takes a constant value of approximately 1.0 over the entire range of steering angle changing rates θH.

Finally, at step S508, the upper limit of wheel slip ratio ρlim (ρlim1 for the drift-out restraint control and ρlim2 for the spin restraint control) is calculated by multiplying these valves x, y and z all together. As apparent, the upper limit of wheel slip ratios ρlim becomes larger with an increase in vehicle speed Vscs, steering angles θH and/or steering angle changing rate θH'. The first upper limit of wheel slip ratio ρlim1 for the drift-out restraint control is larger than the second upper limit of wheel slip ratio ρlim2 for the spin restraint control. In the drift-out restraint control, the first upper limit of wheel slip ratio ρlim1 for the wheel slip ratio ρ2 of the left front wheel 21LF at the inner side of the cornering path is relatively low and further reduced as the steering angles θH and/or the steering angle changing rate θH' increase. As a result, braking force applied to the front wheel at the inner side of the cornering path is kept lower. In the spin restraint control, the second upper limit of wheel slip ratio ρlim2 for the wheel slip ratio ρ1 of the right front wheel 21RF at the outer side of the cornering path is relatively high so that braking force applied to the front wheel at the outer side of the cornering path is made as close to the longitudinal component force of the front wheel as possible.

The first upper limit of wheel slip ratio ρlim1 may be established correspondingly not to vehicle speed Vscs, steering angle θH and steering angle change rate θH' but correspondingly to steering angle θH and steering angle change rate θH' only and may be lower than the critical wheel slip ratio ρmax. In the spin restraint control, it is not always necessary to control the braking force applied to the front wheel at the outer side of a cornering path such that a wheel slip ratio ρ of the front wheel becomes below the second upper limit of wheel slip ratio ρlim2.

Further, each of the drift-out restraint control and the spin restraint control may be made based not a yaw rate deviation |ψ'TR−ψ'| or a slip angle deviation |βTR−β| only but on both a yaw rate deviation |ψ'TR−ψ'| and a slip angle deviation |βTR−β|.

The stability control system of the invention may be installed to a vehicle equipped with a braking system having an H-piping type of pipe arrangement.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A driving stability control system for a vehicle equipped with a braking system capable of applying braking force to wheels of the vehicle for controlling said braking system to apply braking force selectively and independently to at least one of the wheels so as to direct the vehicle toward a target direction, said stability control system comprising:

wheel speed detecting means for detecting a wheel speed of each said wheel;

lateral acceleration detecting means for detecting lateral acceleration acting on the vehicle;

yaw rate detecting means for detecting a yaw rate of the vehicle;

steering angle detecting means for detecting a steering angle of a steering wheel; and control means for calculating an actual slip angle and a target slip angle of the vehicle based on said wheel speed, said lateral acceleration, said yaw rate and said steering angle, judging whether the vehicle tends to understeer on the basis of a deviation of said actual slip angle from said target slip angle, and controlling, when the vehicle is judged to tend to understeer, the braking system to apply braking force to a front wheel on an inner trace of a cornering path to impart a yaw moment to the vehicle in a direction in which the vehicle is restrained from understeering so that said front wheel yields a slip ratio less than a specified upper limit wheel slip ratio which is set to be smaller than a slip ratio at which said front wheel provides a maximum longitudinal component force.

2. The driving stability control system as defined in claim 1, wherein said control means changes said upper limit slip ratio smaller as said steering angle increases.

3. The driving stability control system as defined in claim 1, wherein said control means calculates a changing rate of said steering angle and changes said upper limit slip ratio smaller as said steering angle changing rate increases.

4. The driving stability control system as defined in claim 1, wherein said control means judges based on said yaw rate whether an extent of relief of tendency toward understeering of the vehicle is less than a specified extent while the braking system applies braking force to said front wheel, and causes the braking system to apply braking force, not beyond said braking force applied to said front wheel, independently to a rear wheel on said inner trace of said cornering path to impart a yaw moment to the vehicle in a direction in which the vehicle is restrained from understeering so as thereby to control tendency toward understeering of the vehicle when said extent of relief of tendency toward understeering of the vehicle is judged to be less than said specified extent.

5. The driving stability control system as defined in claim 4, wherein said control means judges based on said yaw rate whether an extent of relief of tendency toward understeering of the vehicle is less than another specified extent while the braking system applies braking force to said rear wheel, and causes the braking system to apply braking force, not beyond said braking force applied to said front wheel, independently to both front wheel on an outer trace of said cornering path and said rear wheel to impart a yaw moment to the vehicle in a direction in which the vehicle is restrained from understeering so as thereby to control tendency toward understeering of the vehicle when said extent of relief of tendency toward understeering of the vehicle is judged to be less than said another specified extent.

6. A driving stability control system for a vehicle equipped with a braking system capable of applying braking force independently to wheels of the vehicle, said stability control system comprising:

a wheel speed sensor for detecting a wheel speed of each said wheel;

a lateral acceleration sensor for detecting lateral acceleration acting on the vehicle;

a yaw rate sensor for detecting a yaw rate of the vehicles;

a steering angle sensor for detecting a steering angle of a steering wheel; and a control unit comprising a microcomputer for calculating an actual slip angle and a target slip angle of the vehicle based on said wheel speed, said lateral acceleration, said yaw rate and said steering angle, judging on the basis of a deviation of said actual slip angle from said target slip angle whether the vehicle tends to understeer, and controlling, when the vehicle is judged to tend to understeer, the braking system to apply braking force to a front wheel on an inner trace of a cornering path to impart a yaw moment to the vehicle in a direction in which the vehicle is restrained from understeering so that said front wheel yields a slip ratio less than a specified upper limit slip ratio which is set smaller than a slip ratio at which said front wheel provides a maximum longitudinal component force.

7. The driving stability control system as defined in claim 6, wherein said control unit judges based on said yaw rate whether an extent of relief of tendency toward understeering of the vehicle is less than a specified extent while the braking system applies braking force to said front wheel, and causes the braking system to apply braking force, not beyond said braking force applied to said front wheel, independently to a rear wheel on said inner trace of said cornering path to impart a yaw moment to the vehicle in a direction in which the vehicle is restrained from understeering so as thereby to control tendency toward understeering of the vehicle when said extent of relief of tendency toward understeering of the vehicle is judged to be less than said specified extent.

8. The driving stability control system as defined in claim 7, wherein said control unit judges based on said yaw rate whether an extent of relief of tendency toward understeering of the vehicle is less than another specified extent while the braking system applies braking force to said rear wheel, and causes the braking system to apply braking force, not beyond said braking force applied to said front wheel, independently to both front wheel on an outer trace of said cornering path and said rear wheel to impart a yaw moment to the vehicle in a direction in which the vehicle is restrained from understeering when said extent of relief of tendency toward understeering of the vehicle is judged to be less than said another specified extent.

* * * * *